US010642773B2

(12) United States Patent
Remis et al.

(10) Patent No.: US 10,642,773 B2
(45) Date of Patent: May 5, 2020

(54) BMC COUPLED TO AN M.2 SLOT

(71) Applicant: LENOVO Enterprise Solutions (Singapore) PTE. LTD., New Tech Park (SG)

(72) Inventors: Luke Remis, Raleigh, NC (US); Pravin Patel, Raleigh, NC (US); Gregory B. Pruett, Raleigh, NC (US)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 28 days.

(21) Appl. No.: 15/938,543

(22) Filed: Mar. 28, 2018

(65) Prior Publication Data

US 2019/0303335 A1    Oct. 3, 2019

(51) Int. Cl.
*G06F 13/40* (2006.01)
*G06F 13/362* (2006.01)

(52) U.S. Cl.
CPC ........ *G06F 13/4068* (2013.01); *G06F 13/362* (2013.01); *G06F 2213/0026* (2013.01); *G06F 2213/0032* (2013.01); *G06F 2213/0042* (2013.01)

(58) Field of Classification Search
CPC .............. G06F 13/4068; G06F 13/362; G06F 2213/0026; G06F 2213/0032; G06F 2213/0042
USPC .................. 710/71, 110, 301, 2, 11, 62, 105
See application file for complete search history.

(56) References Cited

U.S. PATENT DOCUMENTS

| | | | |
|---|---|---|---|
| 9,628,211 B1* | 4/2017 | Stoler | H04J 3/0691 |
| 2003/0182483 A1* | 9/2003 | Hawkins | G06F 9/4411 |
| | | | 710/110 |
| 2005/0160207 A1* | 7/2005 | Chen | G06F 13/409 |
| | | | 710/74 |
| 2014/0173365 A1* | 6/2014 | Itozawa | G06F 11/0724 |
| | | | 714/48 |
| 2014/0258763 A1* | 9/2014 | Senzaki | G06F 1/30 |
| | | | 713/340 |
| 2016/0118121 A1* | 4/2016 | Kelly | G06F 13/4068 |
| | | | 710/301 |
| 2016/0154762 A1* | 6/2016 | He | G06F 13/4282 |
| | | | 710/301 |
| 2017/0083472 A1* | 3/2017 | Su | G06F 13/4045 |
| 2017/0277649 A1* | 9/2017 | Lin | G06F 13/4282 |
| 2017/0315954 A1* | 11/2017 | Chung | G06F 13/4282 |

(Continued)

*Primary Examiner* — Farley Abad
*Assistant Examiner* — Henry W Yu
(74) *Attorney, Agent, or Firm* — Kunzler Bean & Adamson; Bruce R. Needham

(57) ABSTRACT

An apparatus for providing a BMC via an M.2 slot includes a presence module that determines whether a baseboard management controller ("BMC") is coupled to an M.2 expansion slot, the M.2 expansion slot configured to also receive a non-BMC device, a bus module that enables communication between a serial peripheral interface ("SPI") bus and the M.2 expansion slot in response to the BMC being present in the M.2 expansion slot, and a signal conversion module that receives management control signals from the BMC via an unused pin-out of the M.2 expansion slot, in response to the BMC being present in the M.2 expansion slot, and transfers the management control signals to the SPI bus.

20 Claims, 6 Drawing Sheets

(56) References Cited

U.S. PATENT DOCUMENTS

2018/0246835 A1\* 8/2018 Lu .......................... G06F 13/42
2019/0026126 A1\* 1/2019 Liu .................... G06F 9/44505

\* cited by examiner

BMC COUPLED TO AN M.2 SLOT

FIELD

The subject matter disclosed herein relates to a baseboard management controller and more particularly relates to providing a BMC via an M.2 slot.

BACKGROUND

A baseboard management controller ("BMC") is a subsystem used to measure the health of the server. For example, the BMC may track error sensors and provide a means to update system firmware while the servers off. However, BMC hardware adds extra cost to a server and is not wanted or needed by all customers.

BRIEF SUMMARY

An apparatus for providing a BMC via an M.2 slot is disclosed. A method and system also perform the functions of the apparatus. One embodiment of an apparatus includes a presence module that determines whether a baseboard management controller ("BMC") is coupled to an M.2 expansion slot. Here, the M.2 expansion slot is configured to also receive a non-BMC device. The apparatus also includes a bus module that enables communication between a serial peripheral interface ("SPI") bus and the M.2 expansion slot in response to the BMC being present in the M.2 expansion slot. Additionally, the apparatus includes a signal conversion module that, in response to the BMC being present in the M.2 expansion slot, receives management control signals from the BMC via an unused pin-out of the M.2 expansion slot and transfers the management control signals to the SPI bus.

One embodiment of a method for providing a BMC via an M.2 slot includes determining whether a BMC is coupled to an M.2 expansion slot, the M.2 expansion slot configured to also receive a non-BMC device. The method also includes enabling a communication between a SPI bus and the M.2 expansion slot in response to the BMC being present in the M.2 expansion slot. Additionally, the method includes receiving management control signals from the BMC via an unused pin-out of the M.2 expansion slot in response to the BMC being present in the M.2 expansion slot. The method further includes transferring the management control signals to the SPI bus.

One embodiment of a system for providing a BMC via an M.2 slot includes a server having an M.2 expansion slot configured to receive a storage device and a pluggable BMC removably coupled to the M.2 expansion slot. Here, the server determines whether the pluggable BMC is coupled to the M.2 expansion slot, the M.2 expansion slot being configured to also receive a non-BMC device. In response to the pluggable BMC being present in the M.2 expansion slot, the server enables communication between a SPI bus of the server and the M.2 expansion slot. Additionally, the pluggable BMC transmits management control signals to the server via an unused pin-out of the M.2 expansion slot.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
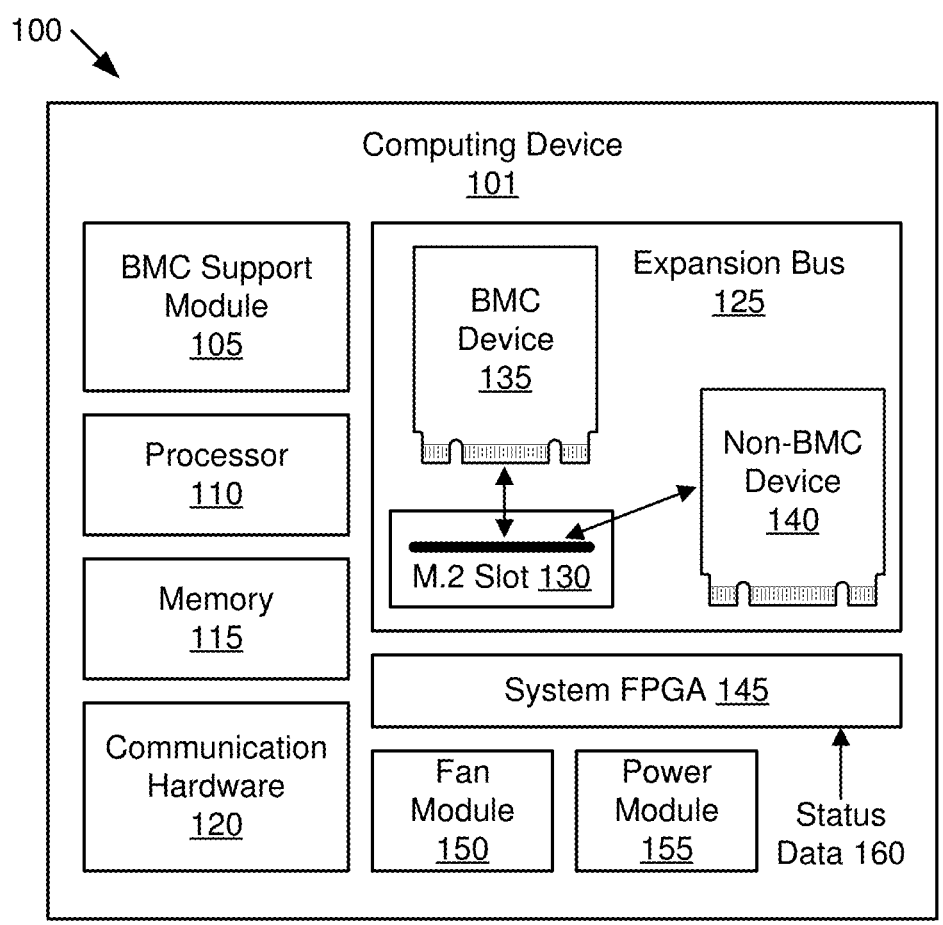
FIG. 1 is a schematic block diagram illustrating one embodiment of a system for a BMC device using an M.2 slot.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more non-transitory computer readable storage devices storing machine readable code, computer readable code, and/or program code, referred hereafter as code. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM), a Flash memory, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Modules may include hardware circuits, a programmable hardware device, a processor executing code and/or code stored on a non-transitory computer readable storage device, or any combination thereof.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes a way to implement an M.2 based BMC solution in a low-cost way, allowing the BMC to remain optional in a server environment. Described herein is an architecture for enabling a removable BMC device to be inserted into a multi-purpose expansion slot on a computer (e.g., server) motherboard, while not burdening the system with any unnecessary cost or development effort. The removable BMC device is typically used to measure the health of the computer (e.g., server). For example, the removable BMC device may receive data from various sensors built into the computer system to report parameters such as temperature, cooling fan speeds, power status, operating system ("OS") status, and the like. The BMC device, in some embodiments, monitors the sensors can send alerts and/or perform corrective actions if any the parameters do not stay within predetermined ranges.

A BMC, in some embodiments, requires specific hardware and a built-in BMC increases the cost of a server. The BMC may be part of the Intelligent Platform Management Interface ("IPMI") and is usually contained in the motherboard or main circuit board of the device to be monitored. Customers who do not wish to use a BMC are burdened with the extra cost of this hardware. However, it is difficult due to development and testing to simply remove the BMC hardware for such customers while still leaving the BMC as an option for others. Specifically, the situation would require the development of two separate versions of the server hardware: a first version that includes the BMC, and a second version that does not include the BMC. Developing two variants of the server hardware increases development cost and testing cost. Moreover, a customer who purchases the version that does not include the BMC has no option to later upgrade their version to support a BMC.

An alternative to developing two separate variants of the server hardware is to create a slot exclusively for a removable (e.g., "pluggable") BMC device. However, such a slot in itself adds an additional cost burden to the customer that does not require a BMC. Moreover, a BMC-exclusive slot takes up valuable physical space on the server for the customer that does not require a BMC.

As described in greater detail below, the present disclosure describes a better alternative when developing server hardware both for customers that desire BMC and those who do not require a BMC, by leveraging an existing slot on the server motherboard to support a removable BMC device. In this way, a BMC can be supported without the cost of developing two separate variants. Moreover, the existing slot is multi-purpose so that if a BMC is not desired, the slot may be used for other functions, such as storage, networking, auxiliary processing, and the like. By using an existing slot, the cost burden is minimized for the customer that is not require a BMC. Moreover, server hardware including the multi-purpose slot is more attractive to customer and server hardware without such a slot, as the multi-purpose slot can be used either for BMC or for another expansion device, such as a solid-state drive ("SSD"), a network interface card, graphics card, and the like.

One example of an existing, multi-purpose slot that can be used to support applicable BMC is the M.2 interface capable of receiving expansion devices (e.g., "cards") compatible with the M.2 standard (previously referred to as the Next Generation Form Factor ("NGFF") standard. The conventional M.2 interface uses PCI Express ("PCIe") connectors to provide computer bus interfaces, for example PCIe 3.0, universal serial bus ("USB") 3.0, and Serial ATA ("SATA") 3.0. The M.2 interface also supports interfaces for storage devices (e.g., for SSDs), such as the legacy Advanced Host Controller Interface ("AHCI") and the Non-Volatile Memory Express ("NVMe") interface. However, the M.2 interface currently does not support BMC functions or the physical interfaces required by a BMC, for example interfaces to the host system management bus ("SMBUS"), host power management bus ("PMBUS"), I2C, etc. Moreover, BMC sideband signals such as reduced gigabit media independent interface ("RGMII") are not supported in the M.2 standard.

Disclosed herein are systems, apparatuses, and methods they use a modified M.2 connector architecture to enable a pluggable BMC without burdening the system with any unnecessary cost or development effort. Here, the modified M.2 connection architecture (referred to herein as "M.2+" architecture) can support both BMC devices and non-BMC devices, such as SSDs or other functions. Moreover, the M.2+ architecture includes one or more integrated circuits providing a way to detect the presence of a BMC device before runtime. Specifically, the M.2+ architecture allows for distinguishing between a BMC device and a non-BMC device, so that appropriate configurations can be applied.

Additionally, the M.2+ architecture provides a way to direct the BMC-unique signals to appropriate server functions. Specifically, BMC sideband signals, such as reduced media independent interface ("RMII") and RGMII signals, are directed to appropriate functions. Moreover, the M.2+ architecture provides means to access host SMBUS, PMBUS, and I2C busses that currently are not connected to the M.2 interface. In various embodiments, the M.2+ architecture selectively connects these busses to the M.2 interface in response to detecting a BMC device present therein. Examples of server functions controllable by the BMC device include, but are not limited to, power control of the server, fan control, and gathering "health" sensor data (e.g., system statuses, operating system status, voltages, etc.).

Still further, the M.2+ architecture includes a system FPGA to manage basic tasks when the BMC device is not present. In various embodiments, the system FPGA checks for the presence of the BMC device in the M.2+ slot upon power on. If no BMC device is found, then the system FPGA configures the server for a 'no BMC' mode, for example setting power permissions, sets fan speeds based on a lookup table, etc. However, if the BMC device is detected in the M.2+ slot, then the system FPGA configures the server for BMC control.

When present, the pluggable BMC controls functions, such as power enable, fan speed, I2C, SMBUS, PMBUS, etc., via the system FPGA through the SPI bus. Here, the BMC device is in control, but uses the system FPGA as a proxy to perform the actual functions. In various embodiments, the SPI bus is connected to one or more electrical connections ("pin-outs") of the M.2 slot for functions that are not being used at the server. One example of an unused pin-out of the audio pin-out, as servers typically do not include or utilize audio functions. Here, the SPI bus uses the "audio" signals on the M.2 connector pin-out to connect to the pluggable BMC device.

An apparatus for providing a BMC via an M.2 slot is disclosed. A method and system also perform the functions of the apparatus. The apparatus includes a presence module that determines whether a BMC device is coupled to an M.2 expansion slot. Here, the M.2 expansion slot is configured to also receive a non-BMC device, such as a storage device, a networking card, or the like. The M.2 expansion slot uses the M.2+ architecture disclosed herein. The apparatus also includes a bus module that selectively enables communication between a SPI bus and the M.2 expansion slot, for example whenever the BMC device is present in the M.2 expansion slot.

Additionally, the apparatus includes a signal conversion module that receives management control signals from the BMC device, for example via an unused pin-out of the M.2 expansion slot. The signal conversion module receives the management control signals in response to the BMC device being present in the M.2 expansion slot. Additionally, the signal conversion module transfers the management control signals to the SPI bus. As described above, these modules may include one or more of: a hardware circuit, a programmable hardware device, and a processor executing code.

In certain embodiments, the non-BMC device is a storage device. Moreover, the apparatus may include a configuration module that enables communication between the M.2 expansion slot and one of the PCIe bus, a USB bus, and a SATA bus whenever the non-BMC device is present in the M.2 expansion slot. In such embodiments, the M.2 expansion slot may receive signals for storage functions from the non-BMC device, for example via one or more of: a USB pin-out of the M.2 expansion slot and a SATA pin-out of the M.2 expansion slot. Here, the signals for the storage functions are transferred to the appropriate bus, such as the above-mentioned PCIe bus, USB bus, and/or SATA bus. In various embodiments, the M.2 expansion slot includes an interface compatible with the M.2 standard (previously referred to as the Next Generation Form Factor ("NGFF") standard.

As mentioned above, the apparatus allows for management control signals to be transferred from the BMC device to the SPI bus using an unused pin-out (e.g., electrical connection) of the M.2 expansion slot. In some embodiments, the pin-out a function not used on a server is repurposed for communicating the management control signals. For example, audio functions are typically unused on a server, thus the M.2 expansion slot may receive "audio" signals from the BMC device (e.g., signals on the audio pin-out). Here, the signal conversion module may convert/transfer signals to the SPI bus as management control signals. In other embodiments, the unused pin-out is a reserved pin-out of the M.2 expansion slot. Here, the signal conversion module may convert/transfer signals on the reserved pin-out to the SPI bus as management control signals.

As mentioned above, the apparatus may selectively enable communication between the M.2 expansion slot and one or more system busses in response to the BMC device being present in the M.2 expansion slot. In one embodiment, the bus module enables communication between a host SMBUS and the M.2 expansion slot. In another embodiment, the bus module enables communication between a host PMBUS and the M.2 expansion slot. In various embodiments, the management control signals communicated via the M.2 expansion slot include one or more of: fan control signals, network controller sideband interface ("NC-SI") signals, signals indicating a power status of the host, signals indicating an operating system status of the host, signals indicating temperature data of the host, and signals indicating voltage data of the host.

As mentioned above, a method may also perform the functions of the apparatus. Specifically, one method includes determining whether a BMC device is coupled to an M.2 expansion slot, where the M.2 expansion slot is also configured to receive non-BMC devices. This method may also include enabling a communication between a SPI bus and the M.2 expansion slot in response to the BMC device being present in the M.2 expansion slot. Moreover, the method may include receiving management control signals from the BMC device via an unused pin-out of the M.2 expansion slot (e.g., when the BMC devices present in the M.2 expansion slot) and transferring the management control signals to the SPI bus. In various embodiments, the M.2 expansion slot includes an interface (e.g., connector) that is compatible with the M.2 standard.

In certain embodiments, the unused pin-out of the M.2 expansion slot is an audio pin-out of the connector. In further embodiments, the method may also include converting signals on the audio pin-out into management control signal for the SPI bus. In other embodiments, the unused pin-out of the M.2 expansion slot is a reserved pin-out of the connector. Here, the method may also include relaying signals on the reserved pin-out to the SPI bus.

In some embodiments, the method includes enabling communication between a host SMBUS and the M.2 expansion slot in response to the BMC being present in the M.2 expansion slot. In some embodiments, the method includes enabling communication between a host power management bus ("PMBUS") and the M.2 expansion slot in response to the BMC being present in the M.2 expansion slot. In various embodiments, the management control signals may be fan control signals, network controller sideband interface ("NC-SI") signals, a power status of a host, an operating system status of the host, temperature data of the host, and/or voltage data of the host.

A system for providing a BMC via an M.2 slot, according to embodiments of the disclosure, may include a server having an M.2 expansion slot configured to receive a storage device (or other non-BMC device) and a pluggable BMC device removably coupled to the M.2 expansion slot. Said M.2 expansion slot uses the M.2+ architecture described herein. Here, the server may determine whether a pluggable BMC device is coupled to the M.2 expansion slot and enable communication between the SPI bus of the server and the M.2 expansion slot in response to determining that the pluggable BMC device is coupled to the M.2 expansion slot. When coupled to the M.2 expansion slot, the pluggable BMC device transmits management control signals to the server via an unused pin-out of the M.2 expansion slot.

In various embodiments, the server also includes a system FPGA connected to the SPI bus. Here, the system FPGA may determine whether the pluggable BMC device is coupled to the M.2 expansion slot. Moreover, the pluggable BMC device controls server functions via the system FPGA (e.g., by communicating the management control signals). As mentioned above, the unused pin-out may be an audio pin-out of the M.2 expansion slot, the pin-out of another function not used by the server, or a reserved pin-out of the M.2 expansion slot. Moreover, when the pluggable BMC device is coupled to the M.2 expansion slot, the server may enable communication between the M.2 expansion slot and a host SMBUS and/or a host PMBUS on the server. In certain embodiments, communication between the M.2 expansion slot and the host SMBUS/PMBUS is disabled if no BMC device is in the M.2 expansion slot. For example, upon detecting that no BMC device is in the M.2 expansion slot, the system FPGA may configure the server FIG. 1 is a schematic block diagram illustrating one embodiment of a system 100 for providing a BMC via an M.2 slot. In one embodiment, the system 100 includes a computing device 101 capable of receiving a removable BMC device 135 or a non-BMC device 140 in the same connector, here and M.2 expansion slot 130. The computing device 101 includes a BMC support module 105, a processor 110, a memory 115, communication hardware 120, and an expansion bus 125. The expansion bus 125 includes an M.2 expansion slot 130 capable of receiving both the BMC device 135 and a non-BMC device 140. In one embodiment, the non-BMC device 140 is a storage device, such as an SSD. In other embodiments, the non-BMC device 140 may be another device having a form and connector compatible with the M.2 standard.

The computing device 101 also includes a system FPGA 145 coupled to the M.2 expansion slot 130. When connected to the M.2 expansion slot 130, removable BMC device 135 is capable of controlling various management functions related to the health of the computing device 101. In some embodiments, the BMC device 135 controls said functions via the system FPGA 145. While a single M.2 expansion slot 130 is depicted, in other embodiments multiple M.2 slots may be present at the computer device 101. However, one or more of the additional M.2 slots may be conventional M.2 slots, rather than the "M.2+" slots discussed herein As described above, management functions may be managed via the system FPGA 145, with the BMC device 135 being in control and using the system FPGA 145 as a proxy to perform the management functions. Example subsystems controllable by the BMC device 135 via the system FPGA 145 include, but are not limited to, a fan module 150 and a power module 155. Further, the BMC device 135 may receive status data 160 via the system FPGA 145, said status data 160 relating to the health of various systems of the computing device 101. Exemplary status data 160 includes, but is not limited to, fan speeds, component temperatures, system voltages, complement power status, operating system status, and the like.

The computing device 101, in various embodiments, includes one or more of a server computer, a desktop computer, a laptop computer, a handheld computer, a security system, a gaming console, or another computing device comprising a multi-purpose expansion slot capable of receiving a BMC device 135 and a non-BMC device 140, such as the exemplary M.2 expansion slot 130.

The BMC support module 105, in one embodiment, enables the computing device 101 to be managed by the removable BMC device 135. In various embodiments, all or a portion of the BMC support module 105 may be embodied in the system FPGA 145. In certain embodiments, at least a portion of the BMC support module 105 is embodied in the expansion bus 125 and/or the M.2 slot 130. In other embodiments, the BMC support module 105 is embodied in a hardware circuit, a programmable hardware device, a processor/controller executing code, and combinations thereof.

As described in further detail below, the BMC support module 105 determines whether the removable BMC device 135 is coupled to the M.2 expansion slot 130. Note that the M.2 expansion slot 130 is configured to also receive the non-BMC device 140. Here, the BMC support module 105 distinguishes between a BMC device 135 being present and a non-BMC device, such as an SSD, being present in the M.2 expansion slot 130. The BMC support module 105 enables communication between a SPI bus (not shown in FIG. 1) and the M.2 expansion slot 130 in response to the removable BMC device 135 being present in the M.2 expansion slot 130.

Moreover, the BMC support module 105 receives management control signals from the BMC device 135 and transfers the management control signals to the SPI bus. In various embodiments, said management control signals are received via an unused pin-out of the M.2 expansion slot 130. In certain embodiments, the BMC support module 105 also converts signals between the unused pin-out and the SPI bus. The BMC support module 105 is discussed in further detail with reference to FIGS. 2-3, below.

The processor 110, in one embodiment, may include any known controller capable of executing computer-readable instructions and/or capable of performing logical operations. For example, the processor 110 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 110 executes instructions stored in the memory 115 to perform the methods and routines described herein. The processor 110, in one embodiment, is communicatively coupled to the BMC support module 105, the memory 115, and the expansion bus 125.

The memory 115, in one embodiment, is a computer readable storage medium. In some embodiments, the memory 115 includes volatile computer storage media. For example, the memory 115 may include a random-access memory ("RAM"), including dynamic RAM ("DRAM"), synchronous dynamic RAM ("SDRAM"), and/or static RAM ("SRAM"). In some embodiments, the memory 115 includes non-volatile computer storage media. For example, the memory 115 may include a hard disk drive, a flash memory, or any other suitable non-volatile computer storage device. In some embodiments, the memory 115 includes both volatile and non-volatile computer storage media.

In some embodiments, the memory 115 stores data relating to providing a BMC via an M.2 slot. For example, the memory 115 may store presence bits, M.2 expansion device identifiers, and the like. In some embodiments, the memory 115 also stores program code and related data, such as an operating system or other controller algorithms operating on the computing device 101.

The communication hardware 120 may support wired or wireless communication between the computing device 101 and another device or network. The wireless connection may include a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The expansion bus 125 provides an interface between the processor 110 and one or more expansion devices, such as the BMC device 135 and the non-BMC device 140. The expansion bus 125 refers to the mechanical and electrical connections coupling the one or more expansion devices to the processor 110. In some embodiments, the expansion bus 125 complies with an industry standard, such as the Peripheral Component Interconnect ("PCI"), PCI extended ("PCI-X"), and PCI Express ("PCIe"), standards.

The M.2 expansion slot 130, in one embodiment, is configured to receive expansion devices compatible with the M.2 standard, such as the non-BMC device 140. Additionally, the M.2 expansion slot 130 is configured to receive a BMC device 135. The M.2 expansion slot 130 uses the M.2+ architecture described herein to support BMC functions when the BMC device 135 is inserted.

The BMC device 135, in one embodiment, is a device configured to be removably coupled with the M.2 expansion slot 130. The BMC device 135 includes hardware circuits, programmable hardware devices, and/or a controller executing code for performing BMC functions at the computing device 101. Examples of BMC functions include, but are not limited to, power control, fan control, failure recovery, and the like. In certain embodiments, the BMC device 135 may provide additional functionality, such as storage or network interface function, in addition to the BMC functions.

The non-BMC device 140 may be any a device configured to be removably coupled to the M.2 expansion slot 130 and that does not provide BMC functions. Here, the non-BMC device 140 complies with the M.2 standard and provides additional functionality to the computing device 101. Throughout the disclosure, reference may be made to a non-BMC storage device, which is one embodiment of the non-BMC device 140. However, other types of expansion devices may be used with the system 100 in the present disclosure is not to be limited to the disclosed examples.

The system FPGA 145, in one embodiment, is configured to provide the BMC device 135 with access to various control functions of the computing device 101. For example, the system FPGA 145 may allow the BMC device 135 to receive the status data 160 and to manage the various control functions, including power control, fan speed control, enabling/disabling sensors, and other functions managed by a BMC.

In various embodiments, the system FPGA provides the BMC device 135 with access to various computer busses/interfaces that are not provided in the M.2 connector. Examples of such computer busses include, but are not limited to, the host SMBUS, the host PMBUS, a host I2C bus, and the like. The system FPGA 145 may be connected to the M.2 expansion slot 130 via a SPI bus. As discussed in greater detail herein, the SPI bus may attach to pin-outs of the M.2 expansion slot 130 that are not used by the computing device 101. One example of an unused pin-out in a server computer is the audio pin-out. Thus, in certain embodiments, the SPI bus may connect the system FPGA 145 to the audio pin-out(s) of the M.2 expansion slot 130.

The fan module 150 is an exemplary function controllable by the BMC device 135. Here, the fan module 150 controls one or more fans of the computing device 101. The BMC device 135 may monitor temperatures of the computing device 101. Based on the temperatures and a current configuration of the computing device 101, the BMC device 135 missing control signals to the fan module 150 to set fan speed at a specific level. In one embodiment, pulse width modulation ("PWM") is used for fan control operations.

The power module 155 is another exemplary function controllable by the BMC device 135. Here, the power module 155 controls the power state of one or more components of computing device 101. The BMC device 135 may monitor power statuses of said compliments. In certain embodiments, BMC device 135 may activate/deactivate components of the computing device 101 via the power module 155. Moreover, the BMC device 135 may power cycle a component of the computing device 101 experiencing an error state or failure state. Still further, the BMC device 135 may deactivate unused/unneeded components of the computing device 101 until a time that the components are needed.

Figure 2:
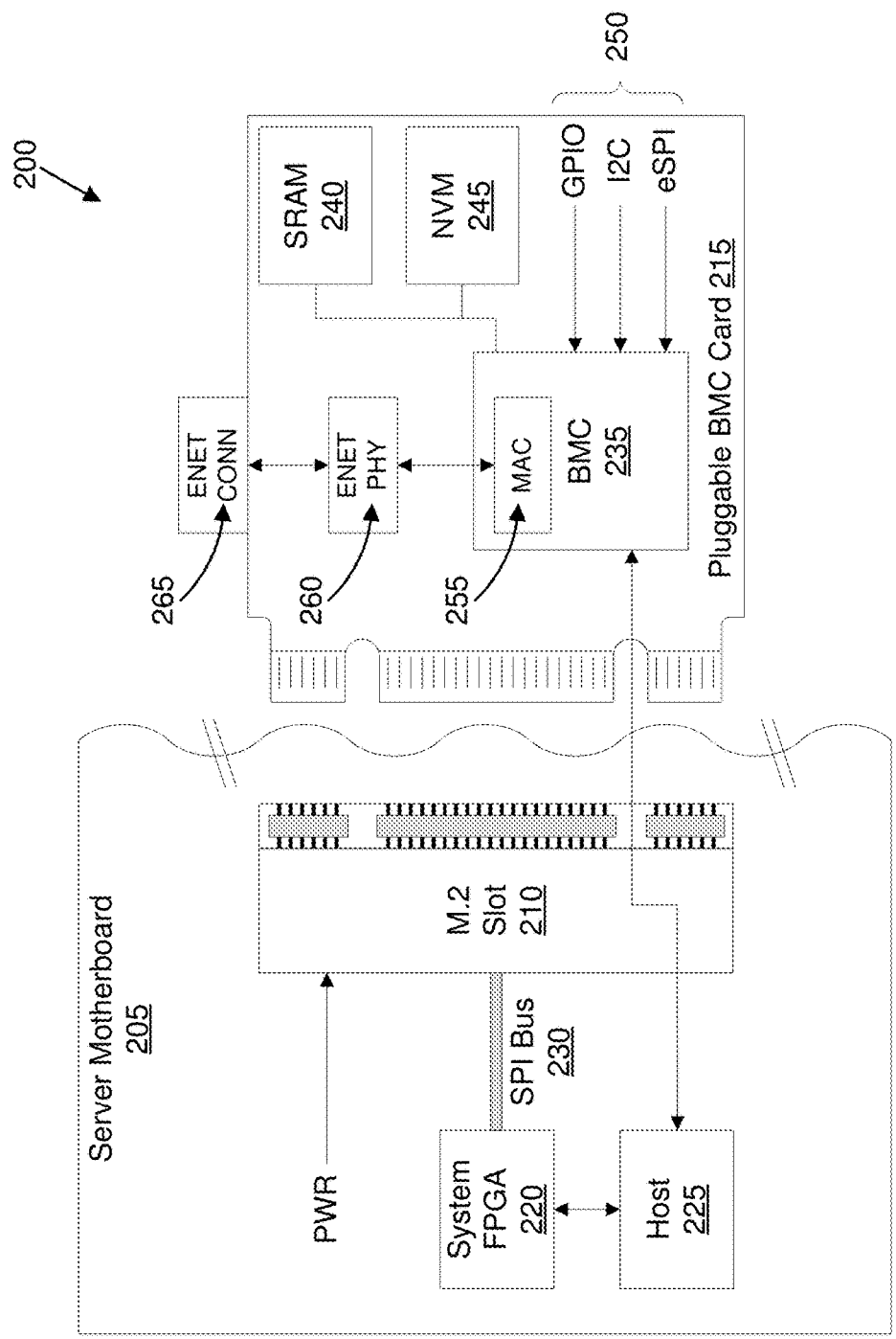
FIG. 2 is a schematic block diagram illustrating one embodiment of another system for providing a BMC via an M.2 slot.

FIG. 2 depicts one embodiments of another system 200 for providing a BMC via an M.2 slot. The system 200 may be one embodiment of the system 100, described above. The system 200 includes a server motherboard 205, which is a main circuit board of a server. The server may be one embodiment of the computing device 101, described above. The server motherboard 205 includes an M.2 slot 210 for receiving an M.2 compatible device. Here, the M.2 slot 210 uses the M.2+ architecture described herein to support BMC devices. Moreover, the system 200 includes a pluggable BMC card 215. Here, the pluggable BMC card 215 may be one embodiment of the BMC device 135, described above.

The server motherboard 205 also includes a system FPGA 220 and a host 225. The system FPGA 220 may be substantially similar to the system FPGA 145, described above. The system FPGA 220 connects to the M.2 slot 210 via an Serial Peripheral Interface ("SPI") bus 230. In certain embodiments, the M.2 slot 210 is "keyed" to accept certain types of M.2 compatible devices. Here, the M.2 standard provides a 75-position edge connector, with certain pin positions being removed present one or more keying notches, the specific notches depending on the type of module. Host-side M.2 connectors (sockets) may populate one or more mating key positions. determining the type of modules accepted by the host 225. For example, the M.2 slot 210 may be keyed to accept storage devices, among other non-BMC devices. As depicted, the pluggable BMC card 215 is keyed to be compatible with the M.2 slot 210. However, other embodiments of the pluggable BMC card 215 may use different keys than the depicted pattern, so as to be compatible with the M.2 slot 210.

When the server motherboard 205 initializes, the system FPGA 220 determines whether the pluggable BMC card 215 is present in the M.2 slot 210. For example, the system FPGA 220 may search for presence bit indicating the presence of the pluggable BMC card 215. In certain embodiments, the presence bit is set whenever any M.2 compatible card is inserted into the M.2 slot 210, but the presence bit does not identify the type of device inserted. In such embodiments, the system FPGA 220 may identify the type of card inserted (e.g., whether a BMC card or a non-BMC card), for example by querying the inserted card, by searching for activity evidencing a BMC card, and the like.

When the pluggable BMC card 215 is not present within the M.2 slot 210, the system FPGA 220 configures the server for a 'no BMC' mode, for example setting power permissions to default levels, setting fan speeds based on a lookup table, etc. However, if the system FPGA 220 detects that the pluggable BMC card 215 is inserted in the M.2 slot 210, then the system FPGA 220 configures the server for BMC control. As discussed above, the pluggable BMC card 215 controls the functions of the host 225 using the system FPGA 220 as a proxy. In some embodiments, the system FPGA 220 enables a connection between the BMC 235 and the host 225 in response to detecting the pluggable BMC card 215. In certain embodiments, the system FPGA 220 relays communications between the BMC 235 and those 225 in response to detecting the pluggable BMC card 215.

In various embodiments, the SPI bus 230 is connected to one or more pin-outs (e.g., electrical connectors) of the M.2 slot 210 that correspond to functions that are not being used at the server. Such functions are referred to as "unused" functions, and the corresponding pin-outs referred to herein as "unused pin-outs." In certain embodiments, the unused pin-out is an audio pin-out, as servers typically do not include or utilize audio functions. Here, the SPI bus 230 uses "audio" signals on the M.2 connector pin-out to connect the system FPGA 220 to the pluggable BMC card 215. Alternatively, a reserved pin-out may be used to connect the SPI bus 230 to the M.2 slot 210.

As depicted, the pluggable BMC card 215 includes a BMC 235 which is the controller (or set of controllers) to manage the server. The BMC 235 may include one or more integrated circuits. Additionally, the BMC 235 is communicatively coupled to its own volatile memory, here depicted as the SRAM 240, and non-volatile memory ("NVM") 245, such as Flash memory. In the various embodiments, any suitable amount of a volatile memory and nonvolatile memory may be used, for example 8 Mb of SRAM and 64 Mb of Flash memory. Here, the NVM 245 may be used to store instructions and/or parameters used by the BMC 235 in its management control functions. Moreover, the SRAM 240 may operate as a working memory for storing instructions, parameters, etc.

In some embodiments, the pluggable BMC card 215 may have its own busses and input/output ("I/O") ports 250, such as the depicted general-purpose input/output ("GPIO") pin(s), I2C bus, and enhanced SPI ("eSPI") bus. Additionally, the pluggable BMC card 215 may have its own network interface, represented by the media access control ("MAC") layer 255, the ethernet physical ("ENET PHY") layer 260, and ethernet connector ("ENET CONN") 265. The BMC 235 may use the networking interface to communicate with the system administrator, for example to send out alerts and receive response instructions/commands. While depicted as a wired network interface, in other embodiments the pluggable BMC card 215 may include wireless network interface components.

As BMC operation uses BMC-unique signals, the system 200 allows for these signals to be directed to the appropriate functions on the server. In some embodiments, BMC 235, when attached to the M.2 slot 210, sends the BMC-unique signals to the system FPGA 220 over the SPI bus 230. As discussed above, the M.2 slot 210 includes an electrical connection to the SPI bus 230 (e.g., via audio pin-outs or other unused pin-outs of the M.2 connector). Upon receiving the BMC-unique signals over the SPI bus 230, the system FPGA 220 transfers these signals to the appropriate functions at the host 225. For example, power control signals are sent to appropriate power control modules or power controllers, fan control signals are sent to the appropriate fan control modules and/or fan controllers, and the like. Moreover, the system FPGA 220 may be connected to various interfaces of the host 225, such as the host SMBUS, the host PMBUS, a host I2C bus, and the like. In this way, the SPI bus 230 and system FPGA 220 allow the BMC 235 to access host interfaces not connected to the M.2 slot 210. Furthermore, through these interfaces the system FPGA 220 is able to manage basic tasks at the host 225 whenever the pluggable BMC card 215 is not present.

Figure 3:
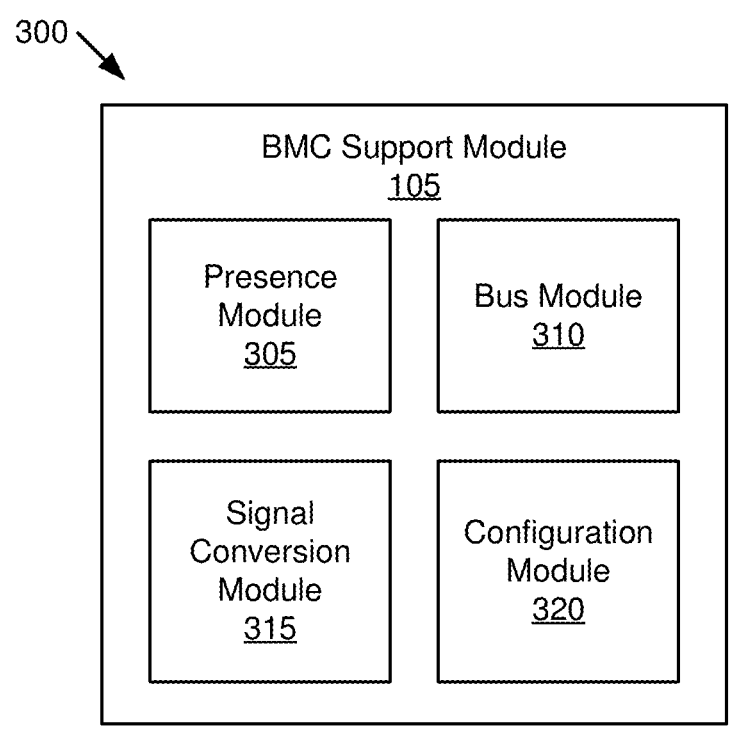
FIG. 3 is a schematic block diagram illustrating one embodiment of an apparatus for supporting a BMC device using an M.2 slot.

FIG. 3 depicts one embodiment of an apparatus 300 for providing a BMC via an M.2 slot. The apparatus 300 includes an embodiment of a BMC support module 105. In one embodiment, the apparatus 300 is a part of a server. As discussed above, all or part of the BMC support module 105 may be embodied in a programmable circuit aboard the (server) motherboard, such as the system FPGA 145 and/or system FPGA 220. The BMC support module 105 includes a presence module 305, a bus module 310, a signal conversion module 315 and a configuration module 320, which are described in more detail below.

In various embodiments, the presence module 305 is configured to determine whether a BMC device, such as the removable BMC device 135 is coupled to an M.2 expansion slot, such as the M.2 expansion slot 130 or M.2 slot 210 described above. Here, the presence module 305 may be configured to distinguish a BMC device from a non-BMC device present in the M.2 expansion slot. For example, the presence module 305 may monitor a presence indicator that indicates whether or not a device is present in the M.2 expansion slot, may query the device present in the M.2 expansion slot, and/or may monitor for activity of a BMC device (e.g., activity distinguishing a BMC device from a non-BMC device). Note that the M.2 expansion slot includes a connector compatible with the M.2 standard.

In various embodiments, the bus module 310 is configured to enable communication between a SPI bus on the server and the M.2 expansion slot in response to the BMC device being present in the M.2 expansion slot. For example, the bus module 310 may permit communication over the SPI bus whenever a BMC device is present in the M.2 expansion slot and prevent communication over the SPI bus whenever a non-BMC device is present in the M.2 expansion slot. As another example, the bus module 310 may monitor communication on the SPI bus whenever a BMC device is present in the M.2 expansion slot and ignore communication on the SPI bus whenever a non-BMC device is present in the M.2 expansion slot.

In certain embodiments, the bus module 310 is configured to enable communication between a host SMBUS and the M.2 expansion slot in response to a BMC device being present in the M.2 expansion slot. In certain embodiments, the bus module 310 is configured to enable communication between a host PMBUS and the M.2 expansion slot in response to a BMC device being present in the M.2 expansion slot. In one embodiment, the bus module 310 enables communication between a host I2C bus in the M.2 expansion slot in response to a BMC device being present in the M.2 expansion slot.

In various embodiments, the signal conversion module 315 is configured to receive management control signals from the BMC device and transfer the management control signals to a server SPI bus. Here, the management control signals from the BMC device are received via an unused pin-out of the M.2 expansion slot. In certain embodiments, signal conversion occurs when transferring the management control signals to the server SPI bus. These management control signals may include one or more of fan control signals, NC-SI signals, signals indicating a power status of the host, signals indicating an operating system status of the host, signals indicating temperature data of the host, and signals indicating voltage data of the host.

In one embodiment, the unused pin-out of the M.2 expansion slot is an audio pin-out. Here, "audio" signals received from the BMC device are then converted into management control signals sent on the SPI bus. In another embodiment, the unused pin-out of the M.2 expansion slot is a reserved pin-out in the M.2 standard, with the signal conversion module 315 relying signals from the reserved pin-out to the SPI bus.

In various embodiments, the configuration module 320 is configured to enable communication between the M.2 expansion slot and a general-purpose bus, such as a PCIe bus, USB bus and/or SATA bus in response to a non-BMC device being present in the M.2 expansion slot. Note that signals from non-BMC device are received over different pin-outs of the M.2 connector then signals from the BMC device. For example, where the non-BMC device is a storage device, such as an SSD, the M.2 expansion slot may receive signals for storage functions via one or more of; a USB pin-out, a SATA pin-out, and the like. Moreover, the configuration module 320 may configure basic management tasks for the server when the BMC device is absent from the M.2 expansion slot, such as basic power permissions, fan speed settings, etc.

Figure 4:
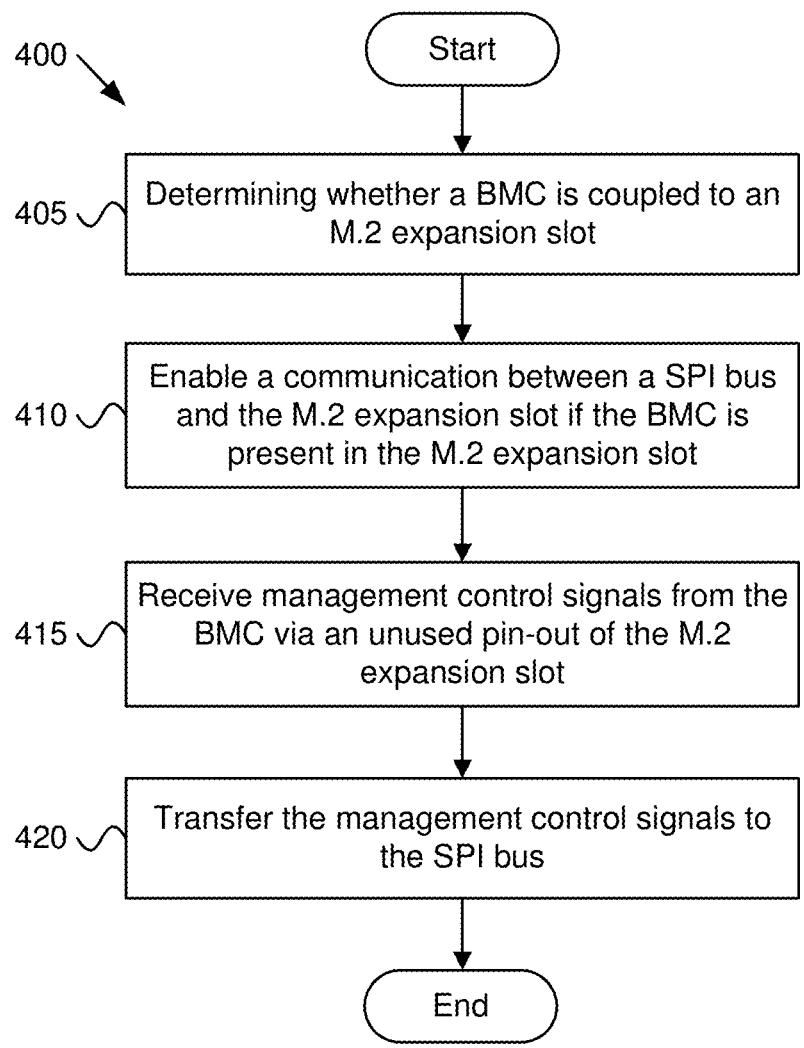
FIG. 4 is a schematic flow chart diagram illustrating one embodiment of a method for providing a BMC via an M.2 slot.

FIG. 4 depicts one embodiment of a method 400 for providing a BMC via an M.2 slot. In one embodiment, the method 400 begins and determines 405 whether a BMC is coupled to an M.2 expansion slot. Here, the M.2 expansion slot is compatible with the M.2 standard and is configured to also receive a non-BMC device, for example a SSD.

In some embodiments, method 400 includes enabling 410 communications between a SPI bus and the M.2 expansion slot in response to the BMC being present in the M.2 expansion slot. In some embodiments, the method 400 includes receiving 415 management control signals from the BMC via an unused pin-out of the M.2 expansion slot in response to BMC being present in the M.2 expansion slot. In further embodiments, the method 400 includes transferring 420 the management control signals to the SPI bus, and the method 400 ends.

In certain embodiments, the unused pin-out of the M.2 expansion slot is an audio pin-out. Here, transferring 420 the management control signals to the SPI bus may include converting audio signals on the audio pin-out to management control signals on the SPI bus. In other embodiments, the unused pin-out of the M.2 expansion slot is a reserved pin-out of the M.2 standard. In one embodiment, management control signals on the SPI bus are transferred 420 to a host SMBUS. In another embodiment, management control signals on the SPI bus are transferred 420 to a host PMBUS. In yet another embodiment, management control signals on the SPI bus are transferred 420 to a host I2C bus.

In one embodiment, the presence module 305, the bus module 310, and the signal conversion module 315 perform the various steps of the method 400. In some embodiments, the method 400 is performed using a BMC support module 105, for example embodied in the computing device 101, system FPGA 145, and/or the system FPGA 220, described above. In some embodiments, the method 400 is performed by a processor, such as a microcontroller, a microprocessor, a central processing unit (CPU), a graphics processing unit (GPU), an auxiliary processing unit, a FPGA, or the like.

Figure 5:
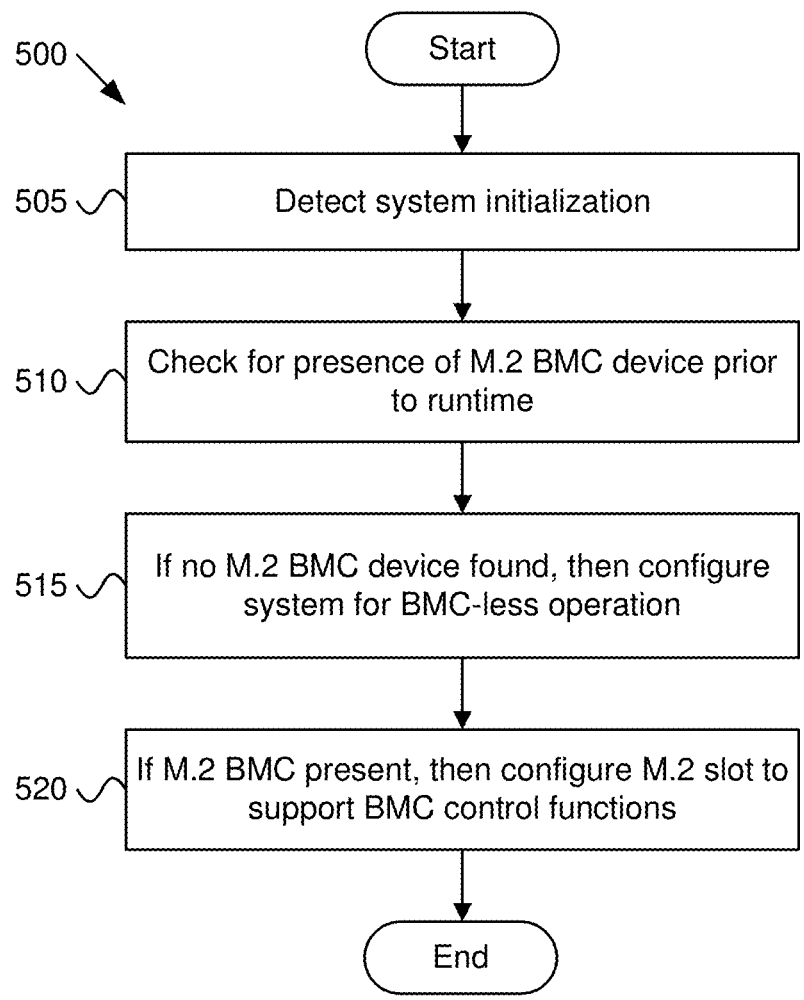
FIG. 5 is a schematic flow chart diagram illustrating one embodiment of another method for providing a BMC via an M.2 slot.

FIG. 5 depicts one embodiment of a method 500 for providing a BMC via an M.2 slot. In one embodiment, the method 500 begins and detects 505 system initialization, for example a server power-on event. In some embodiments, the method 500 includes checking 510 for the presence of an M.2 BMC device (e.g., in an M.2 slot) prior to runtime. Here, checking 510 the presence of an M.2 BMC device may include checking a presence bit, querying a device in the M.2 slot, and the like.

In some embodiments, if no M.2 BMC device is found, then the method 500 includes configuring 515 the system (e.g., server) for BMC-less operation (e.g., a "no BMC" mode). During the BMC-less operation, basic management functions may be handled by a system FGPA as described above. In other embodiments, if an M.2 BMC device is present, then the method 500 configuring 520 the M.2 slot to support BMC control functions, and the method 500 ends. Here, configuring 520 the M.2 slot to support BMC control functions may include enabling communication between the M.2 BMC device and one or more host interfaces, such as SMBUS, PMBUS, host I2C, and the like.

In one embodiment, the presence module 305, the bus module 310, the signal conversion module 315, and the configuration module 320 perform the various steps of the method 500. In some embodiments, the method 500 is performed using a BMC support module 105, for example embodied in the computing device 101, system FPGA 145, and/or the system FPGA 220, described above. In some embodiments, the method 500 is performed by a processor, such as a microcontroller, a microprocessor, a central processing unit (CPU), a graphics processing unit (GPU), an auxiliary processing unit, a FPGA, or the like.

Figure 6:
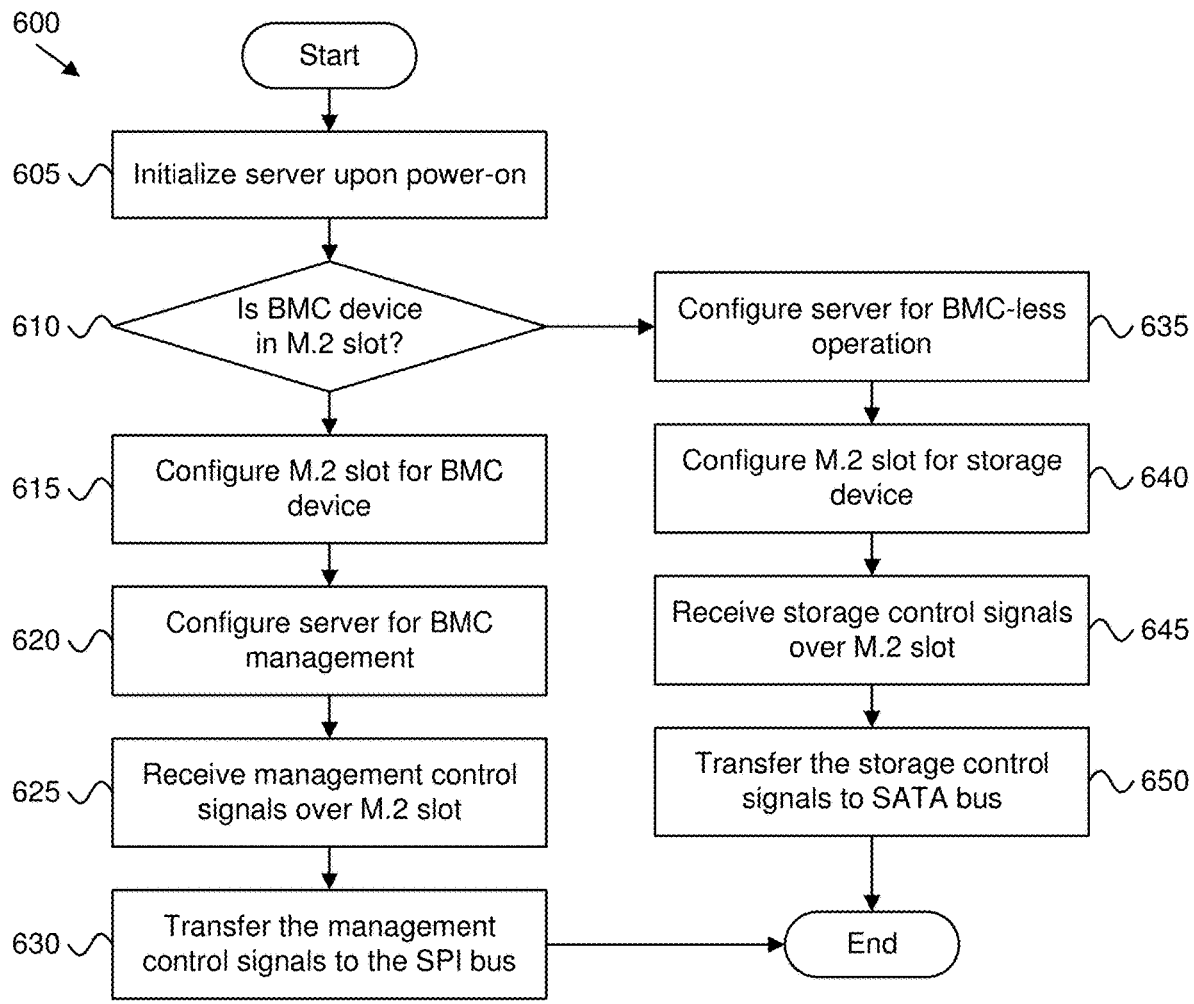
FIG. 6 is a schematic flow chart diagram illustrating one embodiment of a third method for providing a BMC via an M.2 slot.

FIG. 6 depicts one embodiment of a method 600 for providing a BMC via an M.2 slot. In one embodiment, the method 600 begins and initializes 605 a server upon power-on. In some embodiments, the method 600 includes determining 610 whether a BMC device is coupled to an M.2 slot, for example supporting the M.2+ architecture described herein. Moreover, the M.2 expansion slot is compatible with the M.2 standard and is configured to also receive a non-BMC device, for example a SSD.

In some embodiments, in response to a BMC device being present in the M.2 slot, the method 600 includes configuring 615 the M.2 slot for the BMC device. Configuring 615 the M.2 slot for the BMC device may include enabling communication between a SPI bus and the M.2 expansion slot. Moreover, the method 600 may include configuring 620 the server for BMC management. Additionally, the method 600 includes receiving 625 management control signals over the M.2 slot and transferring 630 the management control signals to the SPI bus.

Here, receiving 625 management control signals over the M.2 slot may include receiving the management control signals from the BMC via an unused pin-out of the M.2 expansion slot, such as an audio pin-out. Here, transferring 630 the management control signals to the SPI bus may include converting audio signals on the audio pin-out to management control signals on the SPI bus. In one embodiment, management control signals on the SPI bus are transferred 630 to a host SMBUS. In another embodiment, management control signals on the SPI bus are transferred 630 to a host PMBUS. In yet another embodiment, management control signals on the SPI bus are transferred 630 to a host I2C bus.

In other embodiments, in response to no BMC device being present at the M.2 slot, the method 600 includes configuring 635 the server for BMC-less operation (e.g., a "no BMC" mode). During the BMC-less operation, basic management functions may be handled by a system FGPA as described above. In certain embodiments, the method 600 also includes configuring 640 the M.2 slot for a storage device, receiving 645 storage control signals of the M.2 slot, and transferring the storage control signals to a SATA bus. In other embodiments, the storage control signals may be transferred to another suitable bus interface, such as PCIe 3.0, USB 3.0, and the like. The method 600 ends.

In one embodiment, the presence module 305, the bus module 310, the signal conversion module 315, and the configuration module 320 perform the various steps of the method 600. In some embodiments, the method 600 is performed using a BMC support module 105, for example embodied in the computing device 101, system FPGA 145, and/or the system FPGA 220, described above. In some embodiments, the method 600 is performed by a processor, such as a microcontroller, a microprocessor, a central processing unit ("CPU"), a graphics processing unit ("GPU"), an auxiliary processing unit, a FPGA, or the like.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a presence module that determines whether a baseboard management controller ("BMC") is coupled to an M.2 expansion slot of a computer, the M.2 expansion slot configured to also receive a non-BMC device;
    a bus module that enables communication over a serial peripheral interface ("SPI") bus connected to the M.2 expansion slot in response to the BMC being present in the M.2 expansion slot; and
    a signal conversion module that receives management control signals over the SPI bus from the BMC, in response to the BMC being present in the M.2 expansion slot, and transfers the management control signals to the computer,
    wherein said modules comprise one or more of a hardware circuit, a programmable hardware device, and a processor executing code.

2. The apparatus of claim 1, wherein the non-BMC device is a storage device, the apparatus further comprising a configuration module that enables communication between the M.2 expansion slot and one of a Peripheral Component Interconnect Express ("PCIe") bus, a universal serial bus ("USB"), and a Serial AT Attachment ("SATA") bus in response to the non-BMC device being present in the M.2 expansion slot, wherein the SPI bus is connected to a pin-out not used by the M.2 expansion slot for PCIe, USB and SATA communications.

3. The apparatus of claim 2, wherein the M.2 expansion slot receives signals for storage functions from the non-BMC device via one or more of: a USB pin-out of the M.2 expansion slot and a SATA pin-out of the M.2 expansion slot.

4. The apparatus of claim 1, wherein the M.2 expansion slot comprises an interface compatible with an M.2 standard.

5. The apparatus of claim 1, wherein the unused pin-out is an audio pin-out of the M.2 expansion slot, wherein the signal conversion module transmits management control signals via the SPI bus through the audio pin-out.

6. The apparatus of claim 1, wherein the bus module enables communication between a host system management bus ("SMBUS") and the M.2 expansion slot in response to the BMC being present in the M.2 expansion slot.

7. The apparatus of claim 1, wherein the bus module enables communication between a host power management bus ("PMBUS") and the M.2 expansion slot in response to the BMC being present in the M.2 expansion slot.

8. The apparatus of claim 1, wherein the management control signals comprise one or more of: fan control signals, network controller sideband interface ("NC-SI") signals, a power status of a host, an operating system status of the host, temperature data of the host, and voltage data of the host.

9. A method comprising:
    determining whether a baseboard management controller ("BMC") is coupled to an M.2 expansion slot of a computer, the M.2 expansion slot configured to also receive a non-BMC device;
    enabling a communication over a serial peripheral interface ("SPI") bus connected to the M.2 expansion slot in response to the BMC being present in the M.2 expansion slot;
    receiving management control signals over the SPI bus from the BMC in response to the BMC being present in the M.2 expansion slot; and
    transferring the management control signals to the computer.

10. The method of claim 9, wherein the M.2 expansion slot comprises an interface compatible with an M.2 standard.

11. The method of claim 9, wherein the unused pin-out is one of an audio pin-out of the M.2 expansion slot and a reserved pin-out of the M.2 expansion slot.

12. The method of claim 9, wherein the non-BMC device is a storage device, the method further comprising enabling communication between the M.2 expansion slot and one of a Peripheral Component Interconnect Express ("PCIe") bus, a universal serial bus ("USB"), and a Serial AT Attachment ("SATA") bus in response to the non-BMC device being present in the M.2 expansion slot, wherein the SPI bus is connected to a pin-out not used by the M.2 expansion slot for PCIe, USB and SATA communications.

13. The method of claim 9, further comprising enabling communication between a host system management bus ("SMBUS") and the M.2 expansion slot in response to the BMC being present in the M.2 expansion slot.

14. The method of claim 9, further comprising enabling communication between a host power management bus ("PMBUS") and the M.2 expansion slot in response to the BMC being present in the M.2 expansion slot.

15. The method of claim 9, wherein the management control signals comprise one or more of: fan control signals, network controller sideband interface ("NC-SI") signals, a power status of a host, an operating system status of the host, temperature data of the host, and voltage data of the host.

16. A system comprising:
    a server having an M.2 expansion slot configured to receive a storage device; and
    a serial peripheral interface ("SPI") bus connected to the M.2 expansion slot,
    wherein the server:
        determines whether a pluggable baseboard management controller ("BMC") is coupled to the M.2 expansion slot, the M.2 expansion slot being configured to also receive a non-BMC device; and
        enables communication over the SPI bus and the M.2 expansion slot in response to the pluggable BMC being present in the M.2 expansion slot,
    wherein the server receives management control signals from the pluggable BMC via the M.2 expansion slot and the SPI bus.

17. The system of claim 16, wherein the server comprises a system field programmable gate array ("FPGA") connected to the SPI bus, wherein the system FPGA determines whether the pluggable BMC is coupled to the M.2 expansion slot, wherein the pluggable BMC controls server functions via the system FPGA.

18. The system of claim 16, further comprising the pluggable BMC.

19. The apparatus of claim 1, further comprising a configuration module that performs management tasks in response to the presence module determining that a BMC is not coupled to the M.2 expansion slot, wherein the signal conversion module receives management control signals from the BMC to perform the management tasks in response to the presence module determining that the BMC is coupled to the M.2 expansion slot.

20. The system of claim 16, wherein the non-BMC device is a storage device, the apparatus further comprising a configuration module that enables communication between the M.2 expansion slot and one of a Peripheral Component Interconnect Express ("PCIe") bus, a universal serial bus ("USB"), and a Serial AT Attachment ("SATA") bus in response to the non-BMC device being present in the M.2 expansion slot, wherein the SPI bus is connected to a pin-out not used by the M.2 expansion slot for PCIe, USB and SATA communications.

* * * * *